United States Patent [19]

Stenkvist

[11] 4,032,704
[45] June 28, 1977

[54] METHOD AND APPARATUS FOR TREATING A METAL MELT

[75] Inventor: Sven Einar Stenkvist, Vasteras, Sweden

[73] Assignee: Asea Aktiebolag, Vasteras, Sweden

[22] Filed: Sept. 17, 1975

[21] Appl. No.: 614,214

[30] Foreign Application Priority Data

Sept. 20, 1974 Sweden .............................. 7411831

[52] U.S. Cl. .................................................. 13/10
[51] Int. Cl.² .......................................... H05B 7/20
[58] Field of Search ............. 13/9, 10, 33; 266/240, 266/265

[56] References Cited

UNITED STATES PATENTS

| | | | |
|---|---|---|---|
| 2,789,152 | 4/1957 | Ham et al. ......................... | 13/10 X |
| 3,101,385 | 8/1963 | Robinson ............................ | 13/33 |
| 3,905,589 | 9/1975 | Schempp et al. .............. | 266/240 X |
| 3,918,692 | 11/1975 | Öberg ............................. | 266/240 X |

Primary Examiner—R. N. Envall, Jr.
Attorney, Agent, or Firm—Kenyon & Kenyon, Reilly, Carr & Chapin

[57] ABSTRACT

A metal melt is treated by injecting fluid material into the melt below its surface and which material does not add heat to the melt during the injecting, thus requiring the addition of heat to the melt during the injecting, to maintain the melt's temperature. This heat is added by forming an electric arc between an electrode and the melt, using a DC power supply connected to the electrode and to a connector in contact with a lower portion of the melt, with the electrode connected to make it a cathode and the connector connected with the power supply so that it, and, therefore, the melt, form an anode.

6 Claims, 2 Drawing Figures

METHOD AND APPARATUS FOR TREATING A METAL MELT

BACKGROUND OF THE INVENTION

This invention relates to a method and apparatus for treating a metal melt, for example, a steel melt to be refined by the addition to it of lime, alloying materials, ore concentrates, pulverized coal or mixtures thereof, and possibly other materials, which do not, through reacting with the melt, add heat to the melt.

The Fredrikson et al U.S. application Ser. No. 499,759, filed Aug. 22, 1974, issued July 27, 1976 as U.S. Pat. No. 3,971,547 and assigned to the assignee of the present application, discloses a method and apparatus wherein such materials, in a fluent condition, as by being granulated, are pressure-injected into a melt below the upper surface of the melt, with the melt contained in a convertor-like vessel which can be tilted between substantially vertical and horizontal positions and having a tapping hole in its side which is downward when the vessel is horizontal. The vessel has an open top for initially charging it with the melt and it has a lower portion or bottom in which a channel-type inductor is positioned with the channel extending diagonally downwardly away from that side of the vessel which is lowermost when the vessel is horizontal, so that whether the vessel is vertically positioned or horizontally positioned, sump metal can always be retained in the inductor's channel. For the injection of the fluent material, a nozzle or tuyere is positioned in the lower portion of the furnace pointing upwardly at approximately the focus of the melt currents characteristically formed by the melt circulating in the inductor's channel in an electrodynamic manner. This arrangement is for the purpose of preventing the fluent materials, usually in the form of solid particles, from getting into the inductor's channel, and causing trouble there.

The above described apparatus, has the disadvantage that the electric power which can be supplied to the inductor, is limited; the amount of heat that can be added to the melt in the vessel to keep it at a proper temperature during the injection of the fluent material, is consequently limited,. This is due to the size limitations of channel-type inductors imposed by considerations of initial construction expense and servicing problems. For practical reasons, it is not desirable to provide the vessel with more than two of the inductors.

In the same field, the purpose of the present invention is to provide a way to avoid the limitations described above, while retaining the advantages of the tilting convertor-like vessel which can be vertically positioned for charging with the melt and for the injection of the fluent materials, and which, after the treatment, can be tilted to its horizontal position for tapping through the tap hole which is in the then downward side of the vessel. As disclosed by the aforesaid Fredrikson et al application, it is desirable that the tilting vessel have a removable cover for its top, which is applied to the vessel's top after the melt charging and which has a gas outlet so that gases resulting from reactions between the injected materials and the melt, can be collected and carried away from the vicinity of the vessel.

SUMMARY OF THE INVENTION

According to the present invention, the tilting, elongated, convertor-like furnace vessel, with the tap hole in the vessel's side which is downward when the vessel is horizontal, has a lower portion or bottom which declines, as did the inductor channel described above, at all times, whether the vessel is vertical, tilting, or horizontal. However, at the bottom of this declining portion, there is positioned an electric contactor of the type disclosed by the U.S. Stenkvist application Ser. No. 587,714, filed June 17, 1975, and also assigned to the assignee of the present application. That type comprises an elongated metal connector having a refractory enclosure exposing an inner end of the connector for contact with and incidental melting by the melt, with means for cooling the connector between its inner and outer ends and for removing heat at a rate preventing the connector from melting throughout its length to its outer end. Such a connector may be made with a cross-sectional area sufficient to carry heavy electric currents and by making the connector with a composition which is the same or at least similar to that of the melt in the vessel, which contacts and melts the inner portion of the connector, compositional compatibility results.

With a melt connector of the above type, it is desirable to always maintain a portion of the melt above the inner and possibly molten end of the connector, to ensure the maximum possible tranmission of electric current at all times, including after the tapping of a melt from the vessel provided with the connector. This is ensured by the diagonally extending arrangement of the connector, always downwardly whether the furnace vessel is vertical or horizontal.

It is, of course, possible to get high electrical power into a melt by using a furnace vessel having a conductive bottom, but this expedient requires the use of a furnace bottom made of electrically conductive material, such as graphite, this being both expensive and possibly being a limitation on the furnace vessel's capacity.

Keeping the foregoing in mind, the elongated convertor-like vessel of the present invention can be provided with electric arc heating by extending an electrode down through its top, with the electrode having a lower end spaced above the melt in the furnace and through which melt heavy electric currents can be passed. As explained later, it is preferable that the connector and the melt, and the electrode, be connected with a DC power source, with the electrode operating as a cathode and the connector and melt as an anode. More than one electrode and, therefore, arc can be used. In the practical sense, there is no longer any limitation on the electric power and, therefore, heat that can be put into the melt during the injection of the fluent materials which not only do not add heat to the melt as previously mentioned, but may actually have a cooling effect.

With this new method and apparatus, the fluent material injection nozzle is positioned in the side of the furnace vessel which is opposite that side which is downward when the vessel is horizontal and from which the described connector extends diagonally, and the nozzle is pointed diagonally downwardly to obtain a deep injection of the materials injected; the injection nozzle can be pointed directly at the described electrical connector because there is no channel in which solid particles can enter as in the case of the channel-type inductor previously described.

In the above way the advantages of the apparatus of the aforesaid Fredrikson et al application are retained while its disadvantages, essentially as to power limitation, are removed.

BRIEF DESCRIPTION OF THE DRAWINGS

The accompanying drawings schematically illustrate the principles of this invention, and in which.

DETAILED DESCRIPTION OF THE INVENTION

Figure 1:
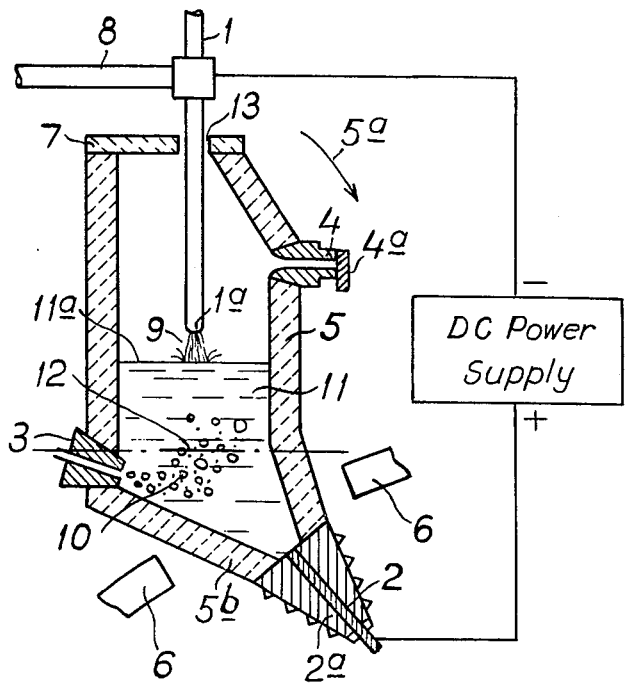
FIG. 1 is a vertical section showing one form of the invention.

Keeping in mind what has been said hereinabove, FIG. 1 shows the arcing electrode 1, which may be of the usual graphite type or of the type having graphite clad with a metal sheath, the melt connector being shown at 2, the fluent material injection nozzle at 3, and the tapping hole at 4, all of which are part of the vertically elongated furnace vessel 5 which may be constructed in the usual manner and which tilts in the direction indicated by the arrow 5a. The top of the vessel 5 can be closed by a removable cover 7 which, when removed permits charging of the vessel 5. The electrode 1, and there may be more than one electrode, although not shown, can be mounted by a cantilever arm 8 in the usual fashion, both for adjustment of the arc 9 and to permit removal of the electrode 1 completely, when the furnace is tilted to its horizontal position (not shown).

The furnace vessel 5 can be generally cylindrical and it has a generally conical lower portion or bottom 5b terminated by the housing 2a of the connector 2, the latter being made of metal that is the same or compatible with the melt in the vessel 5, its inner end being directly exposed to the melt and thereby rendered molten and its outer end remaining a solid metal conductor because the housing 2a provides for the cooling which abstracts the melt heat from the connector 2 at the latter's outer portion, all as described in more detail by the previously-referred-to Stenkvist patent application. The lower portion or bottom 5b extends diagonally with respect to the longitudinal axis of the vessel 5, in the direction 5a towards which the vessel tilts to its horizontal position for tapping of a finished melt through the tap hole 4 which, incidentally, is normally provided with a valve 4a suitable for operation at the high temperatures involved.

The nozzle or tuyere 3 points diagonally downwardly into the interior of the vessel 5 and in the general direction of the conical portion 5b of the vessel 5, this providing for a deep injection of the fluent material 10 into the melt 11 previously charged into the vessel 5. FIG. 1 shows the downward inclination of the pointing direction of the nozzle 3 relative to a plane 12 which is horizontal when the vessel is vertical.

It is to be noted that if the material 10 is in the form of solid particles carried by a compressed carrier gas which is inert with respect to the melt 11, that with the present invention it is immaterial whether or not any of these particles get down into the downwardly tapered or conical lower portion or bottom 5b of the vessel 5. Although not shown, it is possible to provide this portion, and, if desired, also the balance of the melt-containing portion of the vessel 5 with electric induction stirring coils for the purpose of promoting dissolving or reacting, and also distribution, of the fluent material 10, particularly when solid particles, in the melt 11.

Assuming the melt 11 to be steel which is partly refined or partly finished, the injected material 10 may consist of particulated lime, alloys ore concentrates, pulverized coal and the like, which add none or very little heat to the melt 11, as contrasted to the reaction heat resulting from the blast of a Bessemer convertor. The amount and rate of the injection of such materials, normally carried by compressed gas, as previously indicated, the gas itself having a cooling action, depends on the rate to which heat can be added to the melt 11 to keep it at a temperature required for the desired reactions or dissolving of the injected material.

The arc formed between the electrode's bottom tip 1a and the upper level 11a of the melt 11, is shown as being powered by a DC power supply connected so the electrode 1 forms a cathode, and the melt 11, and, of course, the connector 2, form an anode. Therefore, the DC arc 9 can be driven with a high voltage and a low current, permitting the electrode tip 1a to be spaced much farther than usual above the melt level 11a, where the electrode is more protected from splashing metal and slag, the latter normally being formed in many cases due to the injection of the material 10, for example, when lime is injected for desulfurization of a steel melt. Because the electrode, and particularly its tip 1a, is relatively free from destructive conditions incidental to the use of an AC arc, the arc can be relatively very highly powered to put a great deal of heat into the melt 11. In addition, the electrode, normally being of graphite construction, does not itself appreciably add carbon to the melt 11, again assuming this to be a steel melt.

In some cases the reactions of the material 10 with the melt 11 produces gases, and in the case of FIG. 1, these gases may exhaust through the space formed by the hole 13 in the removable cover 7, between the periphery of this hole and the electrode 1 which depends through this hole 13.

During the refinishing or finishing of the melt 11, the fluent material 10 can be injected via the nozzle 3, at a high velocity, thus stirring the melt 11 vigorously, depending, of course, on the injection velocity of the material particles. This promotes quick reactions or dissolving actions, and in addition, keeps the melt 11 stirred to maintain its temperature substantially uniform throughout its entire volume. As previously indicated, inductive stirring can also be used if desired.

Localized stirring of the melt 11 in the depending conical portion 5b of the vessel, is also possible by using external electric solenoids, generally indicated at 6, possibly attached to the outside of this portion of the vessel, and providing a magnetic field trasversing the current path between the inner end of the connector 2 and the arc 9, through the melt 11. In that case the magnetic flux obtained therefrom in cooperation with the current in the bath will provide a stirring force F, which acts according to the well-known law of magnetic forces:

$$\bar{F} = \bar{B} \times \bar{I},$$

B being the magnetic field and I the current in vector form. In this way an additional stirring may be obtained.

The previously-referred-to Fredrikson et al application explains the desirability of providing the convertor there disclosed with a vessel cover 1, (although removable, it is gas-tight) and having an exhaust system for gases developed during the treatment of the melt, and means for injecting compressed gas into the vessel when it is horizontal during tapping, to thereby effect a pressure tapping which, among other things, increases the speed with which the vessel can be tapped, thereby decreasing the need for the addition of heat to the melt to keep it at a proper tapping temperature during the tapping.

Figure 2:
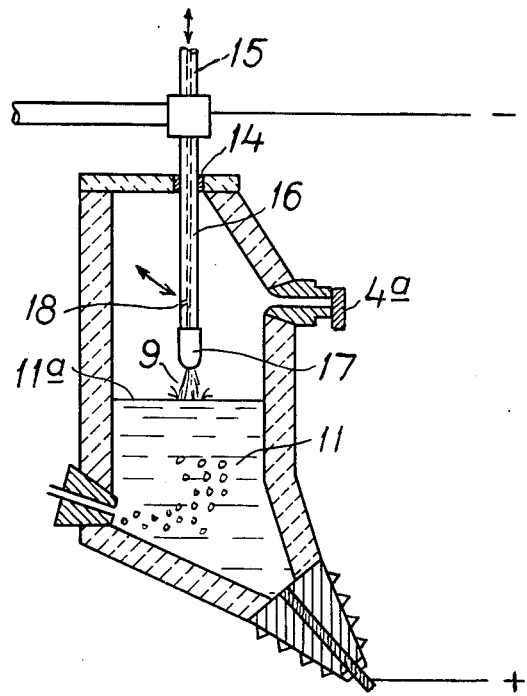
FIG. 2, also in vertical section, provides another example.

With the above in mind, FIG. 2 substantially duplicates FIG. 1, but shows the use of a hollow electrode 15 forming a passage 16 which opens into the inside of the vessel 5 above the melt level 11a. The lower end of this electrode 15 is provided with a graphite tip 17 as is desirable for forming the arc 9. In this case the electrode opening 14 through the cover 7, forms a gas-tight fit with the electrode 15.

In the above way the vessel of the present invention is provided not only with a gas exhaust but also with a compressed gas inlet during the tapping operation when the vessel is horizontal and the tap hole 4 is open. Using a gas which is inert with respect to the melt, the melt is tapped rapidly under the gas pressure which increases the normal gravitational flow of the melt. With the electrode 15 positioned substantially coaxially within the cylindrical vessel 5 and with the melt level 11a necessarily kept low relative to the upper parts of the vessel 5 and its cover 7, for the same reason that this practice prevails in the case of practically all arc furnaces, the volume of the melt 11, when the vessel is horizontal for tapping, is insufficient to permit its then upper level from immersing the gas passage connection 18 of the electrode 15.

It is to be emphasized again, that because of the diagonal direction of the conical portion 5b of the vessel 5, a melt sump is retained over the inner end of the connector 2 whether the vessel is vertical or horizontal, as is desirable in the case of the particular type of connector involved by the present invention.

What is claimed is :

1. A convertor for treating a metal melt by injecting into the melt a material which does not add heat to the melt during the injecting, comprising a vertically elongated vessel for containing the melt and which tilts between substantially vertical and substantially horizontal positions, said vessel having a top which can be open for charging the vessel with the melt, and a side having a tap hole and which is downward when the vessel is in its said horizontal position for tapping the melt, said vessel having a lower portion and a nozzle pointing into this lower portion for said injecting, said lower portion having an electric power connector therein and which is contacted by the melt and said vessel having an electric arc heating electrode depending through its top for heating the melt by an electric arc, said heating electrode being adapted to be powered by DC fed through said power connector and melt and the heating electrode via said arc.

2. The convertor of claim 1 having a DC power supply for said electrode and connector and connected to make the electrode a cathode and the connector and, therefore, the melt, an anode.

3. The convertor of claim 1 in which said nozzle points obliquely downwardly with respect to a horizontal plane through said vessel when the vessel is in said vertical position.

4. The convertor of claim 1 in which the vessel's top is closed by a cover having an electrode opening through which said electrode extends and a gas exhaust passage separated from said electrode opening.

5. The convertor of claim 4 in which said electrode comprises a hollow rod having a gas port inside of said cover and a gas port outside of the cover.

6. A convertor for treating a metal melt by injecting into the melt a material which does not add heat to the melt during the injecting, comprising an elongated vessel for containing the melt and which tilts between substantially vertical and substantially horizontal positions, said vessel having a top which can be open for charging the vessel with the melt, and a side having a tap hole and which is downward when the vessel is in its said horizontal position for tapping the melt, said vessel having a lower portion and a nozzle pointing into this lower portion for said injecting, said lower portion having an electric power connector therein and which is contacted by the melt and said vessel having an electric arc heating electrode depending through its top for heating the melt by an electric arc, said vessel being substantially cylindrical and axially elongated and the vessel's said lower portion being substantially conical and extending diagonally with respect to the vessel's longitudinal axis and in a direction towards the vessel's side which is downward when the vessel is in its said horizontal position, said power connector being positioned in the apex of said lower portion into which said nozzle points, said convertor having means for electrically powering said melt and heating electrode via said power connector and the melt and heating electrode with DC connected so that said heating electrode is cathodic and the melt is anodic, said power connector comprising a solid metal elongated conductor extending through said apex, having an inner end exposed to and melted by said melt and an outer terminal end that is cooled so that it is solid metal, said nozzle pointing diagonally downwardly towards said conical lower portion from a position on the side of said vessel opposite to said lower portion so as to provide for a deep initially downward injection of said material into said melt.

* * * * *